United States Patent
Saboff

(12) 
(10) Patent No.: US 6,584,487 B1
(45) Date of Patent: Jun. 24, 2003

(54) METHOD, SYSTEM, AND APPARATUS FOR MANAGING TASKS

(75) Inventor: Michael L. Saboff, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/441,719

(22) Filed: Nov. 16, 1999

(51) Int. Cl.[7] .................................................. G06F 9/00
(52) U.S. Cl. ........................................ 709/100; 709/102
(58) Field of Search ................................. 709/100, 101, 709/102, 103, 108, 104, 105, 106; 717/149, 154, 159

(56) References Cited

U.S. PATENT DOCUMENTS 5,768,594 A * 6/1998 Blelloch et al. ............ 709/100
6,360,256 B1 * 3/2002 Lim ............................ 709/105

OTHER PUBLICATIONS

Walton, Sean. "Linux Threads Frequently Asked Questions." Sep. 19, 1996. <http://www.linas.org/linux/threads-faq.html>.*

"Implementing Multiple Protection Domains in Java", (visited Sep. 29, 1999) <http://www2.cs.cornell.edu/Slk/jk-0.91/doc/Usenix98-final.html>.

* cited by examiner

*Primary Examiner*—Majid Banankhah

(57) ABSTRACT

A method, system, and apparatus for loading and managing tasks within a process instance on a computer system. The present embodiment novelly distinguishes groups of threads as a task and manages the execution of the threads in the task in the manner specified in a configuration file. The configuration file contains names of tasks and configuration information associated with each task. For example the order of execution of tasks may be defined to depend on the progress of the execution, such as the state, of one or more other tasks. The termination of a single task or multiple tasks may be managed by the present embodiment. The output from a task may be directed to a computer-based input/output (I/O) device, such as a monitor, or to a file, or may be discarded.

19 Claims, 11 Drawing Sheets

METHOD, SYSTEM, AND APPARATUS FOR MANAGING TASKS

FIELD OF THE INVENTION

The present invention relates generally to a method, system, and apparatus for loading and managing tasks on a computer system.

BACKGROUND OF THE INVENTION

Typically, a process operating on a computer system has managed only one thread at a time. Therefore, the operation of running multiple threads requires a separate process instance for each thread or group of threads. Further, a thread may depend on completion of certain states that are associated with one or more threads in another process. However, since threads are managed from separate process instances, information about their state may not be available to threads executing in other process instances. Therefore, when the execution of a thread is dependent on the state of another thread, it may not start executing until the previously executing thread on which it is dependent has completed execution. Therefore, it would be advantageous if threads or groups of threads could be managed from the same process so that the execution of threads could be triggered by the achievement of a state in another thread.

SUMMARY OF THE INVENTION

The present embodiment is a method, system, and apparatus for loading and managing tasks within a process instance on a computer system. The present embodiment novelly distinguishes groups of threads as a task and manages the execution of the threads in the task in the manner specified in a configuration file. The configuration file contains names of tasks and configuration information associated with each task. For example management of the order of execution of tasks may be defined to depend on the progress of execution, such as the state, of one or more other tasks. The termination of a single task or multiple tasks may be managed by the present embodiment. The output from a task may be directed to a computer-based input/output (I/O) device, such as a monitor, or to a file, or may be discarded.

Optionally, the configuration file may contain task-specific information related to configuring a task thereby providing a single place for task configuration information. Also, the configuration file may include symbolic references to specific actions related to the computer system and the symbolic references may be translated prior to execution of the task.

The present embodiment includes a task manager module and may operate with the product marketed under the trademark JAVA™ Classes. However, the present embodiment is not limited in operation to a particular programming language or programming paradigm. Each class associated with the present embodiment may be executed without change by an independent process instance or by a shared process instance. Therefore, the present embodiment enables execution of tasks from an existing process instance, from a new process instance, or from a separate process instance on a different computer system. Also, more than one task may be started from a separate process instance. Additionally, the present embodiment may continue to manage execution of tasks even after the process instance that started the execution of the task has terminated.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figures 1, 1A:
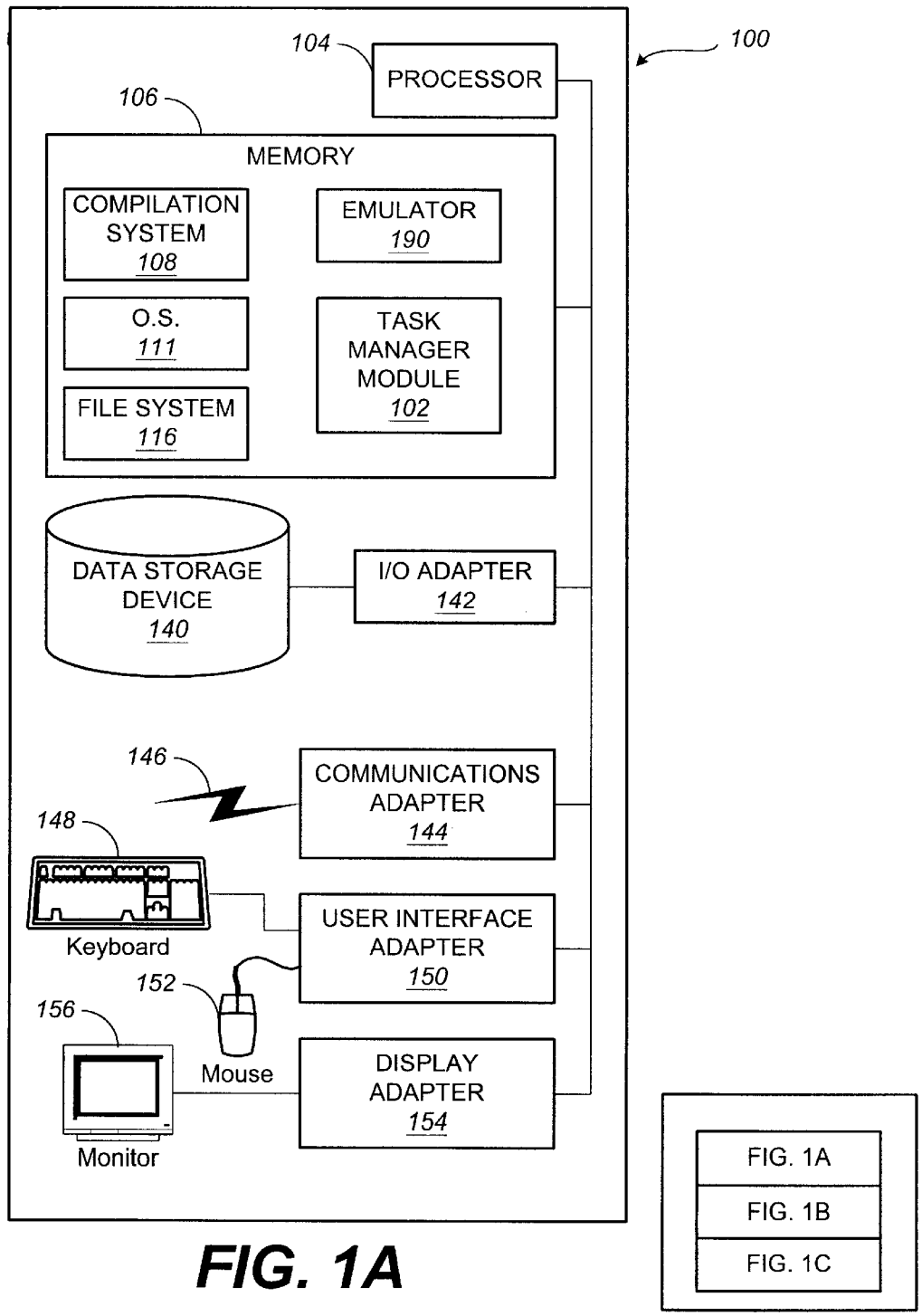
FIG. 1A is a block diagram that illustrates an task manager module that operates in a computer system.

In the following detailed description and in the several figures of the drawings, like elements are identified with like reference numerals.

Figure 2:
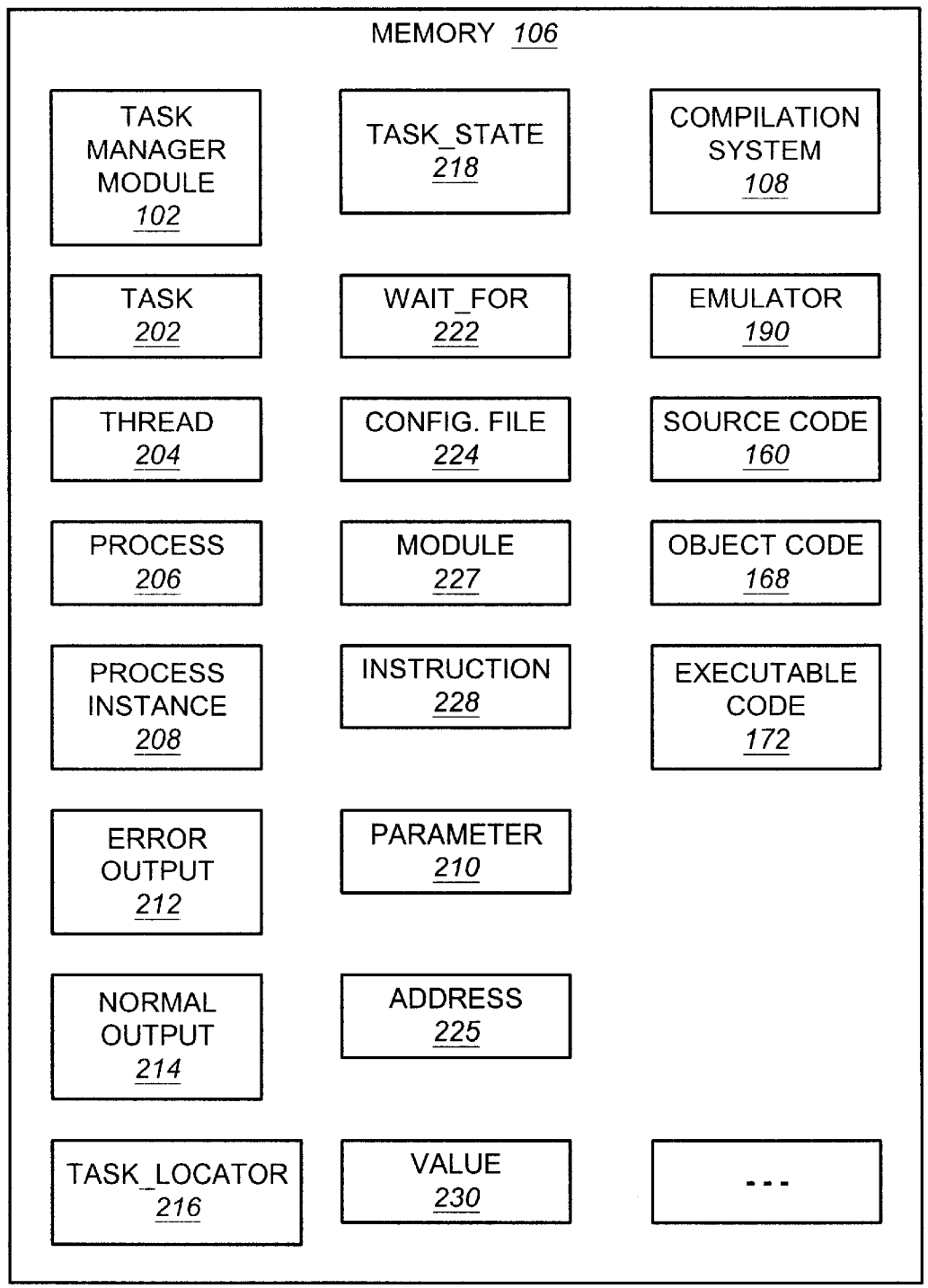
FIG. 2 is a block diagram that illustrates data structures and modules used by the task manager module that may be stored in the memory.

Broadly stated, FIG. 1A is a block diagram that illustrates the task manager module 102 that operates in a computer system 100 and that loads and manages tasks 202 (as shown in FIG. 2) on the computer system 100. The present embodiment enables execution of tasks 202 from an existing process instance 208 (as shown in FIG. 2), from a new process instance 208, or from a separate process instance 208 on a different computer system 100. Also, more than one task 202 may be started from within a separate process instance 208. More particularly, each class associated with the present embodiment may be executed without change by an independent process instance 208 or by a shared process instance 208. Additionally, the present embodiment may continue to manage execution of tasks 202 even after the process instance 208 that started the execution of the task 202 has terminated.

The present embodiment enables execution of at least one task 202 via a configuration file 224 (as shown in FIG. 2). The order of execution of tasks 202 may be defined to depend on the progress of execution, such as the state, of one or more other tasks 202. The termination of a single task 202 or multiple tasks 202 may be managed by the present embodiment. The output from a task 202 may be directed to a computer-based I/O device, such as a monitor, or to a file, or may be thrown away. Optionally, the configuration file 224 may contain task-specific configuration information thereby providing a single place for task 202 configuration information. Also, the configuration file 224 may include symbolic references to specific actions related to the computer system and the symbolic references may be translated prior to execution of the task 202.

A "process" as used herein is a programming structure that maintains its own set of resources while executing, and a thread uses the resources of its associated process. A "process instance" as used herein is a specific instance of a process and may operate in an emulator, such as the product marketed under the trademark JAVA™ Virtual Machine (JVM).

The term "class" as used herein may be a logical grouping of data and instructions and the execution of a class performs at least one operation on a computer system. The structure of a class may be determined by the class variables that represent the state of an object of that class and the behavior of an object of the class is given by a set of methods associated with the class. It will be appreciated that the term "object" as used herein is an instance of a class.

The present embodiment operates by associating a task 202 with at least one thread 204 (as shown in FIG. 2) and manages execution of the task 202 in the order specified in the configuration file 224. A "thread" as used herein is a programming structure that ensures execution of a block of code. That is, a thread 204 refers to a linear control flow of an executing program, and in a multi-threaded environment several paths may be executing simultaneously. Alternatively, a thread 204 may operate in an object-oriented programming environment and may be associated with an object.

Therefore code blocks in a process 206 can operate concurrently in a threads-based programming structure. The term "code block" as used herein refers to a sequence of instructions 228 (as shown in FIG. 2) that execute on a computer system 100. Threads 204 are useful for managing the order and timing of execution of code on a single computer system 100. Also, many computer systems 100 include multiple processors 104 and therefore concurrent execution of threads-based programs may take advantage of computer systems 100 that include multiple processors 104.

It will be appreciated that the term "execute" refers to the process of manipulating code, such as software or firmware instructions 228, for operation on the computer system 100. The term "code" refers to instructions 228 or data used by the computer system 100 for the purpose of generating instructions 228 or data that execute in the computer system 100.

FIG. 1A further represents the computer system 100 that includes components such as a processor 104, the memory 106, a data storage device 140, an I/O adapter 142, a communications adapter 144, a communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that the functions ascribed to the task manager module 102, or any of its functional files, typically are performed by a central processing unit that is embodied in FIG. 1A as the processor 104 executing software instructions 228. The processor 104 typically operates in cooperation with software programs such as the compilation system 108, the operating system (O.S.) 111, and the task manager module 102. Henceforth, the fact of such cooperation among the processor 104 and the task manager module 102, whether implemented in software, hardware, firmware, or any combination thereof, may therefore not be repeated or further described, but will be understood. The task manager module 102 typically operates in cooperation with the emulator 190 and the compilation system 108 but is not limited to such operation. For example the task manager module 102 may operate in cooperation with the O.S. 111.

The O.S. 111 may cooperate with a file system 116 that manages the storage of and access to files within the computer system 100. Files typically include instructions 228 and data. The interaction between the file system 116 and the O.S. 111 will be appreciated by those skilled in the art.

It will also be understood by those skilled in the relevant art that the functions ascribed to the task manager module 102 and its functional files, whether implemented in software, hardware, firmware, or any combination thereof, may in some embodiments be included in the functions of the O.S. 111. That is, the O.S. 111 may include files from the task manager module 102. In such embodiments, the functions ascribed to the task manager module 102 typically are performed by the processor 104 executing such software instructions 228 in cooperation with aspects of the O.S. 111 that incorporate the task manager module 102. Therefore, in such embodiments, cooperation by the task manager module 102 with aspects of the O.S. 111 will not be stated, but will be understood.

The task manager module 102 may be embodied in any computer-readable medium for use by or in connection with an instruction execution system, apparatus, or device, such as a computer system 100 or other system that can fetch the instructions 228. In the context of this document, a "computer-readable medium" can be any medium that can contain, store, communicate, propagate, or transport the program for use by or in connection with the instruction execution system, apparatus, or device. The computer-readable medium can be, for example but is not limited to, an electronic, magnetic, optical, electromagnetic, infrared, or semiconductor system, apparatus, device, propagation medium, or computer memory 106.

Computer memory 106 may be any of a variety of known memory storage devices or future memory devices, including any commonly available random access memory (RAM), cache memory, magnetic medium such as a resident hard disk, or other memory storage devices. In one embodiment the O.S. 111 and the task manager module 102 may reside in the memory 106 during execution in the computer system 100. The term "storage" refers herein to computer resources such as the memory 106, and may be used to store data or instructions 228 used in executing a computer program. The compilation system 108 and the O.S. 111 may also reside in the memory 106 when the task manager module 102 is operating.

It will be appreciated that an emulator 190 maybe included in the computer system 100. The cooperation of the task manager module 102 and the emulator 190 is discussed with reference to FIG. 1C.

The task manager module 102 includes instructions 228 and data that may be referred to as "values" 230 (as shown in FIG. 2). The task manager module 102 may be implemented in the programming language marketed under the trademark JAVA,™ although it will be understood by those skilled in the relevant art that other programming languages could be used. Also, the task manager module 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 148, a mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, program code may typically be loaded through an input device and may be stored on the data storage device 140. A copy of the code or portions of it, may alternatively be placed by the processor 104 into the memory 106 for execution in the computer system 100.

The computer system 100 may communicate with the network 146 through a data transmission communications adapter 144, such as a networking card. The network 146 may be a local area network, a wide area network, or another known computer network or future computer network. It will be appreciated that the I/O device used by the task manager module 102 may be connected to the network 146 through the communications adapter 146 and therefore may not be co-located with the computer system 100. It will be further appreciated that other portions of the computer system 100, such as the data storage device 140 and the monitor 156, may be connected to the network 146 through the communications adapter 144 and may not be co-located.

Figure 1B:
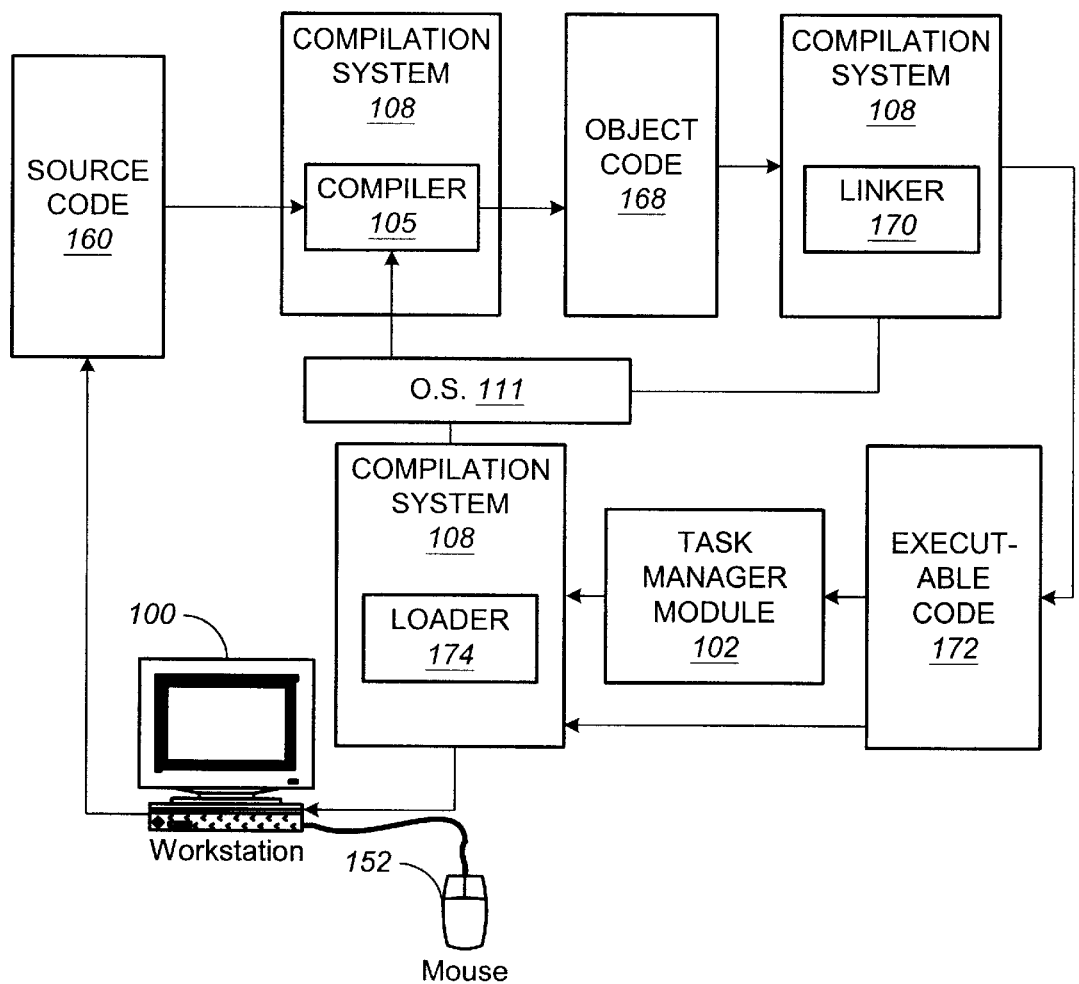
FIG. 1B is a block diagram that illustrates a compiler technology that operates in cooperation with the task manager module.

FIG. 1B is a block diagram that illustrates a compiler technology 108 that operates in cooperation with the task manager module 102. The task manager module 102 may operate with executable code 172 to enable execution of tasks 202 (as shown in FIG. 2). The present embodiment may operate in cooperation with the O.S. 111 and the compilation system 108 thereby enabling execution of a task 202. That is, the present embodiment may employ the compilation system 108 to resolve any system-specific information such as address 225 (as shown in FIG. 2) locations that are necessary to execute the task manager module 102 in the computer system 100. It will be appreciated that the present embodiment operates on any computer system 100 and is not limited to the illustration herein. A software developer may create source code 160 typically in a high-level programming language such as "C" or the product marketed under the trademark JAVA.™

The computer system 100 may manage the processing of the source code 160 through the O.S. 111. The O.S. 111 may direct the processing of the source code 160 by a compiler 105 that may generate object code 168 from the source code 160. In the present embodiment the linker 170 may enable execution by combining one or more object code modules 227 (as shown in FIG. 2) to create combined user process executable code 172 by a process known as linking. The present embodiment may operate with a linker 170 to resolve any undefined computer location references in the object code 168 and to generate executable code 172 capable of executing on an output multi-purpose computer system 100 with I/O devices such as a keyboard 148 (as shown in FIG. 1A) and a mouse 152. It will be appreciated that the input computer system 100 and the output computer system 100 may be the same computer system 100 or different computer systems 100 and are not limited to the configuration illustrated.

In the present embodiment the executable code 172 may be formatted to enable a loader 174 to load the executable code 172 into the computer system 100 for execution. The O.S. 111 cooperates with the loader 174 by starting the process instance 208 associated with the task manager module 102. The task manager module 102 may then load other tasks 202 thereby enabling execution of the other tasks 202.

The executable code 172 may be any of a variety of known executable files or an executable file of a type to be developed in the future. Examples of such known files are those having an extension of ".exe" operating under a DOS or Windows operating system or an "a.out" file of an O.S. 111 marketed under the trademark UNIX.® Further examples of known files are those having an extension of ".so" that are shared object files and ".sl" that are shared library files. The preferred embodiment operates with executable code 172 of the type ".class" and ".jar" that are compatible with the product marketed under the trademark JAVA.™

Figure 1C:
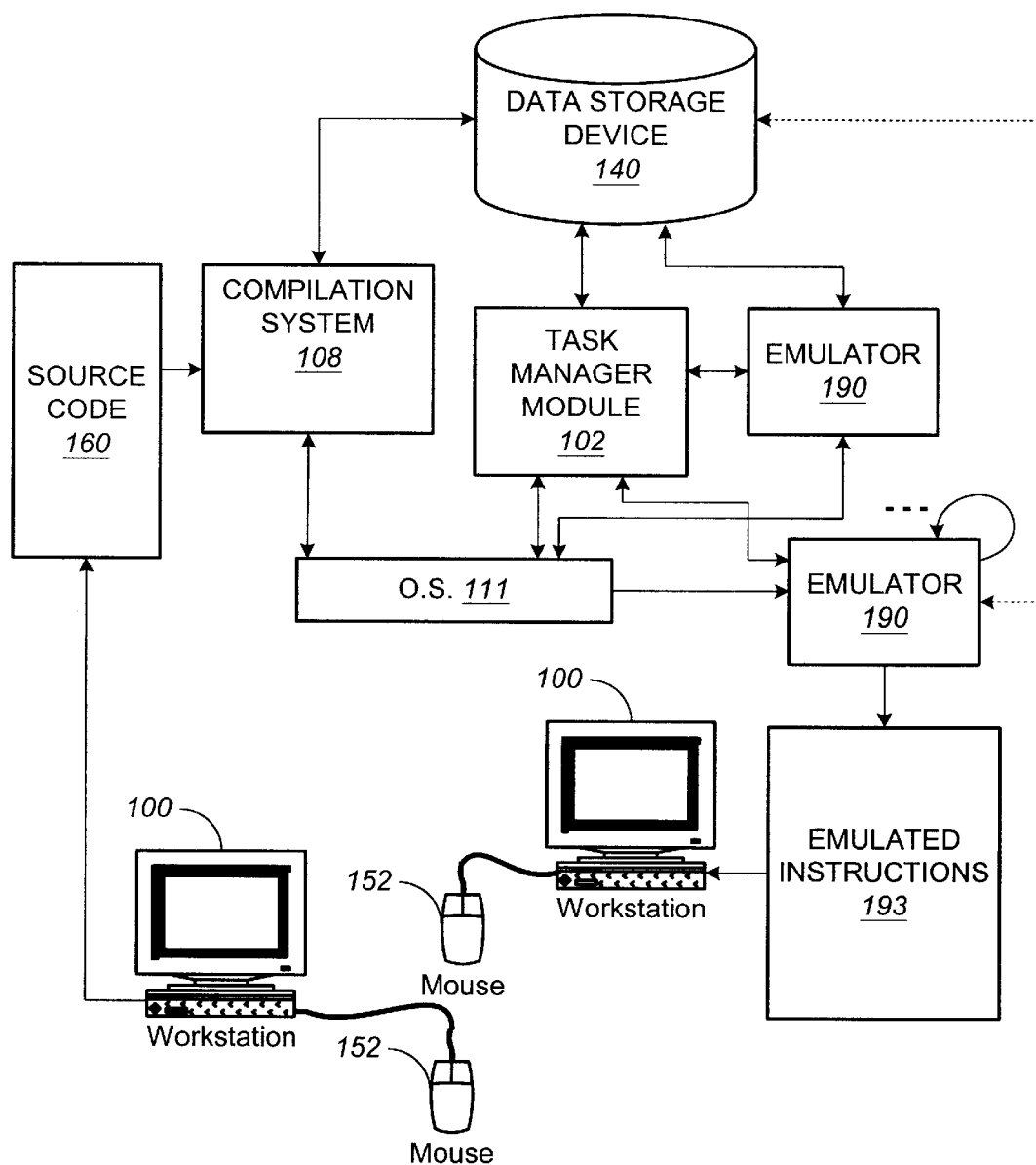
FIG. 1C is a block diagram that illustrates the operation of the task manager module in cooperation with the emulator.

FIG. 1C is a block diagram that illustrates the operation of the task manager module 102 that may cooperate with an emulator 190, such as the product marketed under the trademark JAVA™ Virtual Machine. Source code 160 typically is loaded through an input device and may be stored on the data storage device 140. A copy of the source code 160 or portions of it, may alternatively be placed by the processor 104 into the memory 106 (as are shown in FIG. 1A) for execution on the computer system 100.

The O.S. 111 may associate the source code 160 with the compilation system 108 that may generate code for use by the emulator 190. The O.S. 111 may operate directly with the emulator 190 that may obtain code from a data storage device 140.

In the present embodiment, the O.S. 111 may invoke the task manager module 102 typically in cooperation with the emulator 190. Then the task manager module 102 may operate with the emulator 190 by accessing code, typically via a data storage device 140, and the emulator 190 may use the accessed code to execute a task 202 (as shown in FIG. 2). The task manager module 102 may invoke a plurality of emulators 190 that may cooperate with the task manager module 102 to execute tasks 202.

The emulator 190 may operate, typically in an iterative manner, to create emulated instructions 193. Typically the emulated instructions 193 are associated with a different computer system 100 than the executing computer system 100. For example, the emulator 190 may substitute high level computer code with low level computer code that may be used by other computer-based interpretative systems. It will be appreciated that the substituted instructions 228 may be associated with a hardware, software, or firmware representation of a different computer system 100.

FIG. 2 illustrates data structures and modules 227 used by the task manager module 102 that may be stored in the memory 106. Further, FIG. 2 represents memory-based computer structures that may be embodied in the memory 106 during the execution of the open service execution module 102. The memory 106 may include the following:

a task manager module 102 that loads and manages tasks 202;

a task 202 that is a collection of threads 204 used to perform at least one operation on a computer system 100 (as shown in FIG. 1A);

a thread 204 that is an independent sequence of operations within a process 206;

a process 206 that is a programming structure that maintains its own set of resources while executing, and a thread 204 uses the resources of the associated process 206;

a process instance 208 that is a specific instance of a process 206;

error output 212 that is the location of error information;

normal output 214 that is the location of normal information;

a task_locator 216 that is a parameter 210 and that may be a location or set of locations in the file system 116 (as shown in FIG. 1A) that references tasks 202;

a task_state 218 that is a parameter 210 and that represents the current states associated with a task 202;

a wait_for 222 that is a parameter 210 and that indicates a state associated with a specific task 202 that must be achieved before starting the current task 202;

a configuration file 224 that specifies the order of execution of tasks 202;

a value 230 that may include integer, real, or complex numbers; or characters, or may be a pointer that references values 230 and thereby provides direction to locate a referenced value 230;

a module 227 that may refer to a software procedure or function such as a unit of code that may be independently compiled;

an instruction 228 that may represent a computer address 225 and that may also include parameters 210 that are identifiers for values 230;

an address 225 that may be a computer hardware register or a location in the memory 106 (as shown in FIG. 1A);

a parameter 210 that identifies values 230 and that may provide storage for values 230;

a compilation system 108 that translates program code into instructions 228 that operate on the computer system 100;

an emulator 190 that substitutes instructions 228 typically associated with different computer code or a different computer system 100;

source code 160 that is manipulated by a computer system 100 and that is typically written in a high-level programming language such as "C;"

object code 168 that includes optimization changes that may be dependent on the particular multi-purpose computer system 100 on which the compilation system 108 operates;

executable code 172 that is capable of executing on a multi-purpose computer system 100;

as well as other. data structures and modules 227.

Figure 3:
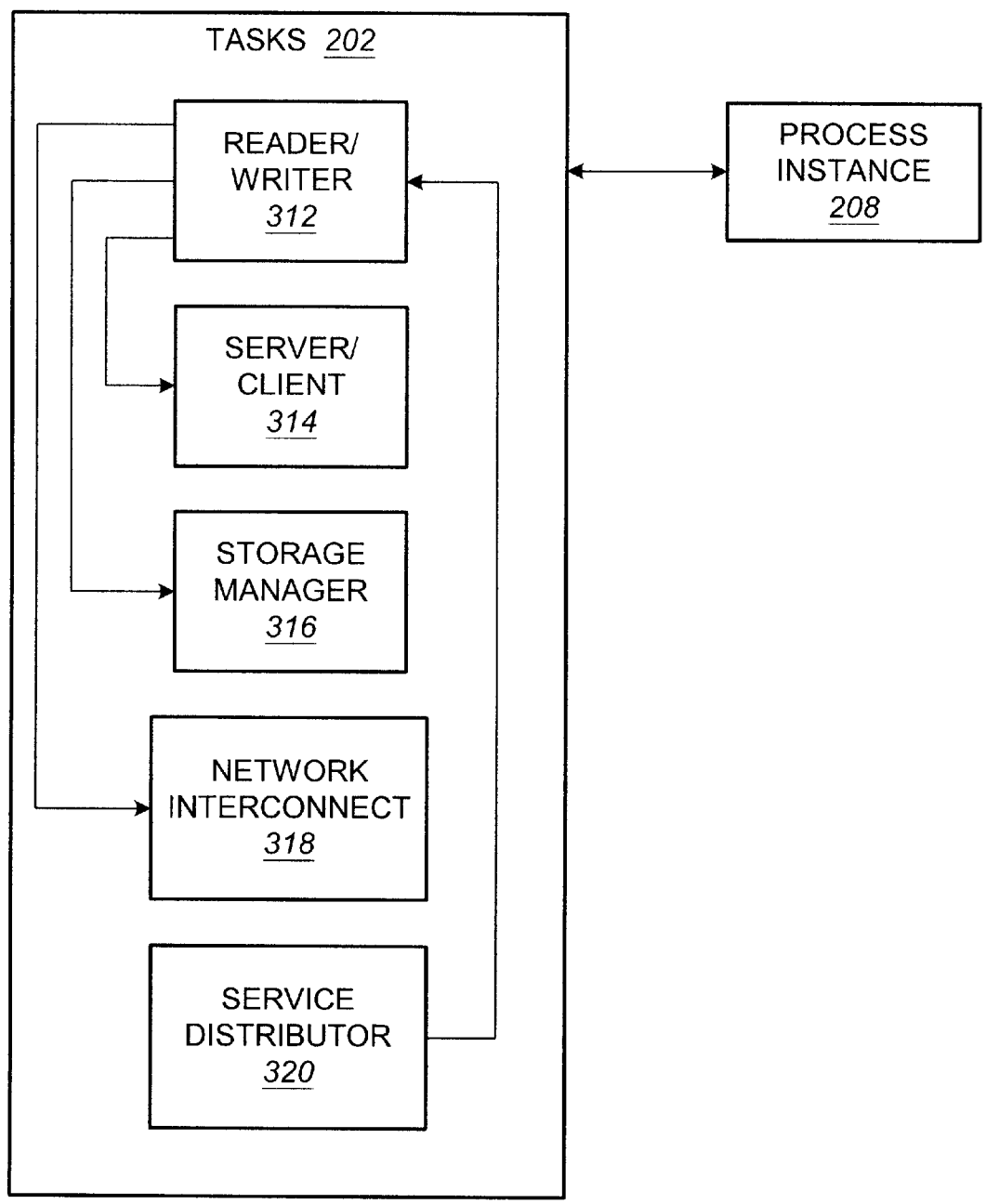
FIG. 3 is a flow diagram that illustrates loading and managing tasks by the present embodiment.

FIG. 3 is a flow diagram that illustrates loading and managing tasks 202 by the task manager module 102. The present embodiment novelly forms tasks 202 that are groups of one or more threads 204 that are managed so that execution may proceed based on the state of other tasks 202.

Recall that the prior art required a separate process instance 208 for each thread 204 or group of threads 204. Since the threads 204 are managed in prior art from separate process instances 208, information about the state of a thread 204 is not accessible to other threads 204. Therefore, when the execution of a thread 204 is dependent on the state of another thread 204, it may not start executing until the previously executing thread 204 on which it is dependent has completed initialization of execution.

According to the present embodiment, the process instance 208 associated with the task manager module 102 (as shown in FIG. 2) may manage tasks 202, such as the reader/writer task 312, the server/client task 314, the storage manager task 316, the network interconnect task 318, and the service distributor task 320. The present embodiment enables computer-based communications between tasks 202 about the state of more than one task 202. Further, the present embodiment novelly manages loading and executing tasks 202 from the same process instance 208.

Therefore in the present example the reader/writer task 312 may be dependent on states associated with the client/server task 314, the storage manager task 316, and the network interconnect task 318. The reader/writer task 312 may begin operation when a particular state associated with the client/server task 314, the storage manager task 316, or the network interconnect task 318 occurs and does not have to wait until the initialization of the execution of a particular task 202. Also, execution of the service distributor task 320 may be dependent on the achievement of a state associated with the reader/writer task 312 and does not have to wait for the initialization of execution of other tasks 202.

Figure 4A:
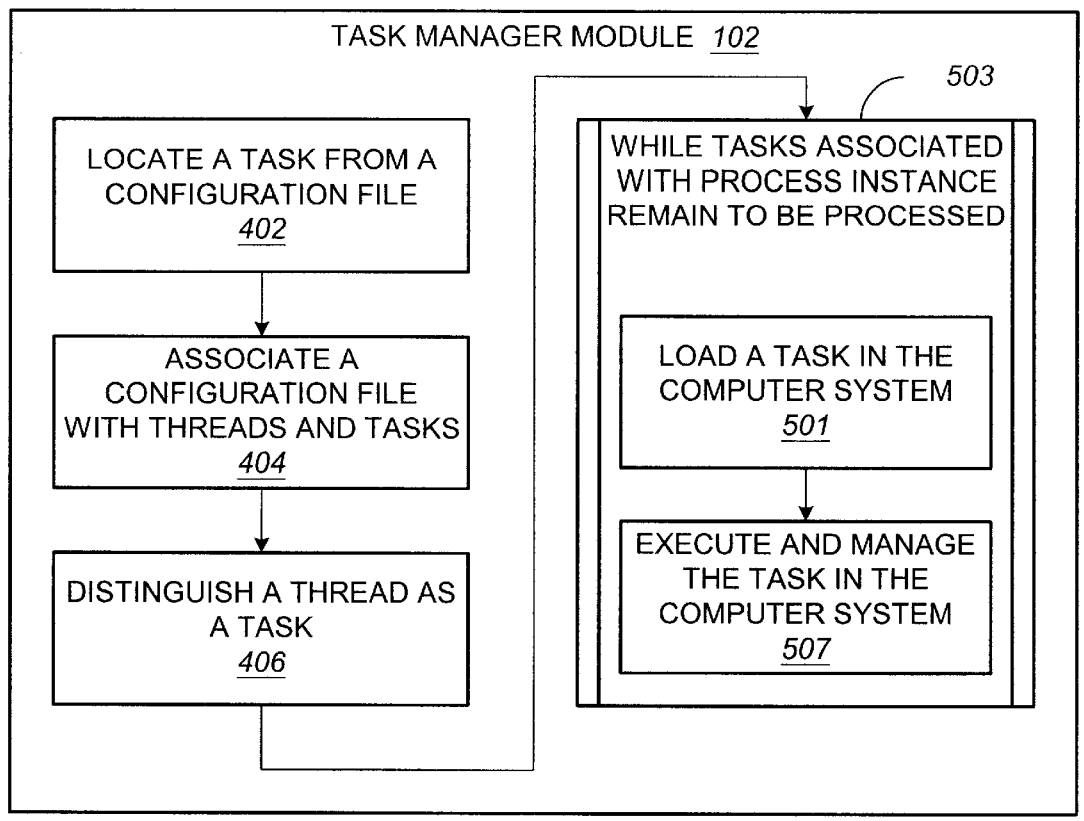
FIG. 4A is a block diagram that illustrates the task manager module.
Figure 4:
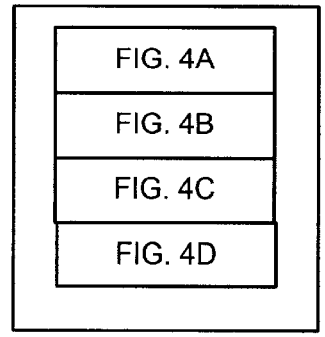
FIG. 4B is a flow diagram that illustrates locating tasks from a configuration file.
FIG. 4C is a flow diagram that illustrates associating tasks and threads with a configuration file.
FIG. 4D is a block diagram that illustrates distinguishing a thread as a task.

FIG. 4A is a flow diagram that illustrates the operation of the task manager module 102 that novelly locates, loads, and manages tasks 202 that are associated with threads 204 (as are shown in FIG. 2). Initially, the present embodiment locates tasks 202 from a configuration file 224 (as shown in FIG. 2) as described in detail with reference to FIG. 4B. Then the present embodiment associates a configuration file 224 with threads 204 and tasks 202 as described in detail with reference to FIG. 4C. At least one thread 204 is distinguished as a task 202 as described in detail with reference to FIG. 4D. Then a task 202 is loaded in the computer system 100 (as shown in FIG. 1A) by the task manager module 102 as shown in element 501 and as described in detail with reference to FIG. 5. Further the task 202 is executed and managed in the computer system 100 as shown in element 507 and as described in detail with reference to FIG. 5. Each task associated with the process instance 208 (as shown in FIG. 2) is loaded and executed by the task manager module 102 as shown in element 503.

Figure 4B:
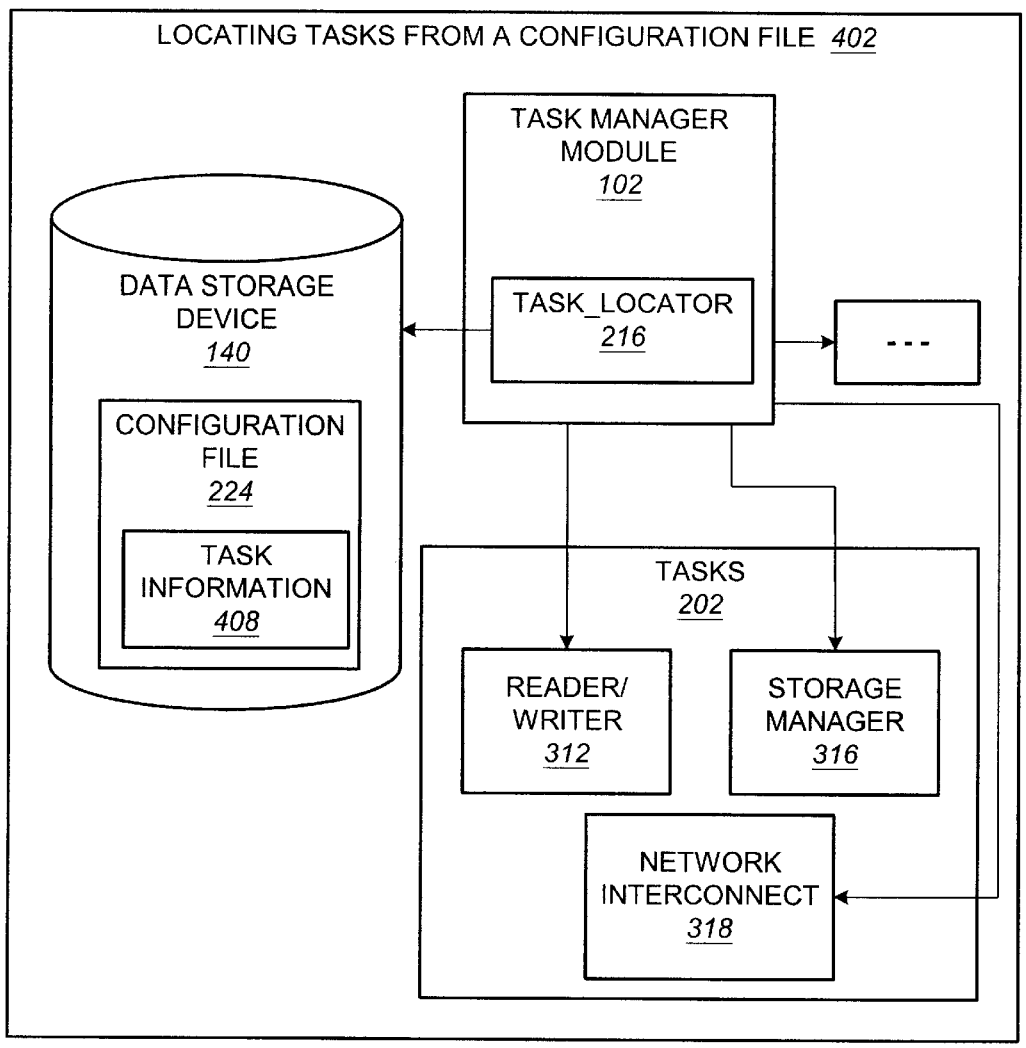

FIG. 4B is a flow diagram that illustrates the operation of locating tasks 202 from a configuration file 224, as shown in element 402. In the present embodiment the task manager module 102 contains the location of the top of a directory structure in the parameter 210 (as shown in FIG. 2) represented by "task_locator" 216. The directory structure is typically embodied as a file system 116 (as shown in FIG. 1A). The parameter 210 represented by "task_locator" 216 identifies at least one location in which the configuration file 224 is stored. The configuration file 224 may be located on any computer-based storage media, such as the data storage device 140. The configuration file 224 includes task information 408, such as the location of tasks 202 and threads 204 such as the reader/writer thread 312, the storage manager thread 316, and the network interconnect thread 318. Therefore, the task manager module 102 may locate tasks 202 and threads 204 by use of the configuration file 224 that is located in a directory that may be identified by the parameter 210 represented by "task_locator" 216.

Figure 4C:
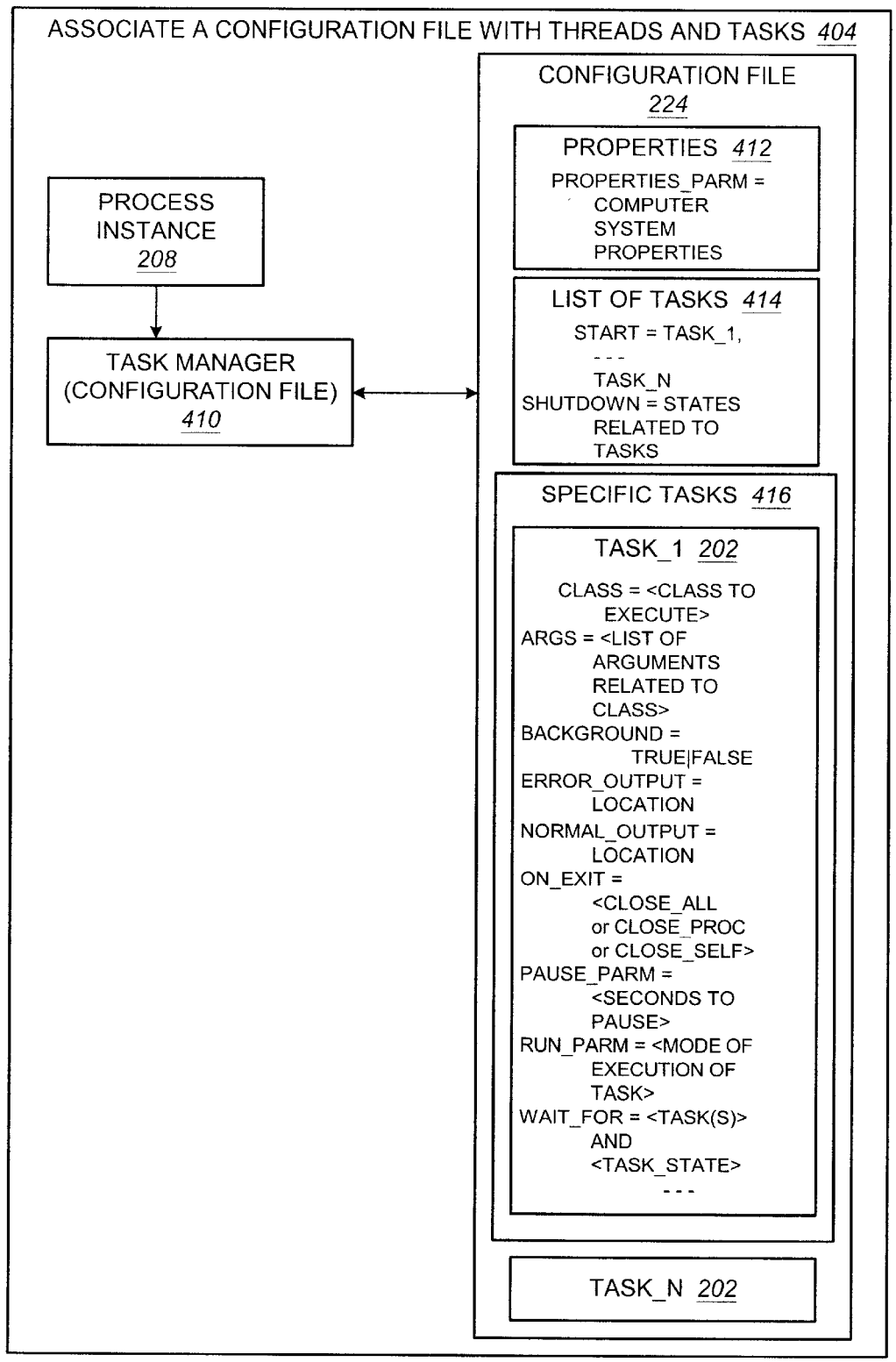

FIG. 4C is a flow diagram that illustrates the association of tasks 202 and threads 204 with a configuration file 224, as shown in element 404. From a process instance 208 the task manager module 102 may be invoked with a parameter 210 (as shown in FIG. 2) that identifies a configuration file 224 that includes information for loading and executing tasks 202, as shown in element 410.

The configuration file 224 may also include an assignment of properties specific to a computer system 100 (as shown in FIG. 1A) to the parameter 210 represented by "properties_parm," as shown in element 412. The properties that are assigned will be reflected in the computer system properties associated with the process instance 208 related to the task 202. For example, properties that are common to all tasks 202, such as environment variables and parameters 210, may be initialized. By means of another example, properties may include information that activate a particular debug level for all tasks 202 associated with the process instance 208. Alternatively and by way of example, properties may include information that alters the operation of the computer system 100, such as the size of the memory 106 (as shown in FIG. 1A) associated with all the tasks 202.

The configuration file 224 contains a list of tasks section, as shown in element 414, that includes an assignment of the tasks 202 associated with the process instance 208 to the parameter 210 represented by "start." The list of tasks 414 is order sensitive and affects the order of execution of tasks 202 associated with the process instance 208. In the present embodiment, the list of tasks section 414 may optionally include a parameter 210 represented by "shutdown" that enables termination of tasks 202 based on states associated with tasks 202. By means of example, the condition in which either task_1 202 is associated with a state having a value "ready" or task_n 202 is associated with a state having a value "start" may trigger termination of the tasks 202 in the list of tasks 414.

Options associated with each task 202 to be executed via the process instance 208 are included in the configuration file 224. Therefore, each specific task 202 will be identified in the configuration file 224 along with its associated options, as shown in element 416. For example, the path of the execution file 172 (as shown in FIG. 2) or the class file associated with the task 202 is assigned to the parameter 210 represented by "class_parm." In one embodiment, the main method for the executable code 172 or class file is invoked. It will be appreciated by those skilled in the art that in a C code implementation the first procedure that controls execution of a software program is the procedure represented by "main." In an implementation in the product marketed under the trademark JAVA™ the class to be executed is identified and a method is executed that is represented by "main." Recall that a class may be a logical grouping of data and instructions 228 and the execution of a class file or executable code 172 performs at least one operation on a computer system 100.

The specific tasks section 416 of the configuration file 224 also contains an assignment of arguments to the parameter 210 represented by "args." The arguments are specific to the class related to the task 202 and in the present embodiment the parameter 210 represented by "args" is an optional field. By means of example, the arguments that are specific to the task 202 may represent information about logging information associated with an execution result, information about an account associated with the task 202, information about devices that cooperate with the executing task 202, or information about communication paths associated with networks 146 (as shown in FIG. 1A) that transmit information associated with the task 202.

The specific tasks section 416 of the configuration file 224 also contains an assignment of "true" or "false" to the parameter 210 represented by "background." If "true" is assigned to the parameter 210 represented by "background," the task 202 is associated with another process instance 208 and the task 202 may continue to execute after the current process instance 208 has terminated.

The specific tasks section 416 of the configuration file 224 may also contain a parameter 210 represented by "error_output" that is the location for error output 212. For example the parameter 210 represented by "error_output" may be assigned null or a file name.

The specific tasks section 416 of the configuration file 224 may also contain a parameter 210 represented by "normal_output" that is the location for normal output 214. For example, the parameter 210 represented by "normal_output" may be assigned null or a file name.

The specific tasks section 416 of the configuration file 224 may also contain a parameter 210 represented by "on_exit" that may be assigned one of the following values 230 in the present embodiment: "close_all," "close_proc," or "close_self." The parameter 210 represented by "on_exit" specifies the action to be taken upon termination of the tasks 202 associated with the process instance 208. If the value 230 "close_all" is specified, all the tasks 202 associated with the task manager module 102 are terminated when the task 202 terminates. If the value 230 "close_proc" is specified the tasks 202 associated with the process instance 208 are terminated. If the value 230 "close_self" is specified only the current task 202 will terminate when it completes execution.

The specific tasks section 416 of the configuration file 224 may also contain a parameter 210 represented by "pause_parm" that contains the number of seconds to delay starting the next task 202 after starting a task 202.

The specific tasks section 416 of the configuration file 224 may also contain a parameter 210 represented by "run_parm" that indicates the mode of execution of the task 202. For instance, the specification of "current_process" indicates that the task 202 is to be started in the current process instance 208. The specification of "new_process" indicates that the task 202 is to be started in a different process instance 208 on the same computer system 100. The specification of "on<host>" indicates that the task 202 is to be started in a different process instance 208 that operates in a different computer system 100 than the current computer system. The different computer system 100 is identified by "host."

The specific tasks section 416 of the configuration file 224 may also contain a parameter 210 represented by "wait_for" 222 that indicates a state associated with a specific task 202 that must be achieved before triggering starting the current task 202. The parameter 210 represented by "wait_for" 222 is assigned the task 202 and the state associated with the task 202. Further, the parameter 210 represented by "wait_for" 222 may be assigned information about multiple tasks 202. The parameter 210 represented by "task_state" 218 may be assigned the following values 230: "loaded," "started," "ready," or "exited." In the present embodiment, the values 230 associated with the parameter 210 represented by "task_state" 218 are order sensitive, starting with "loaded"

and ending with "exited." When the parameter 210 represented by "wait_for" 222 is assigned information about multiple tasks 202 the states associated with all of the multiple tasks 202 must be achieved before starting the current task 202 and the states do not have to be the same.

Additionally in the present embodiment, a user-defined state may be added between the value 230 of "ready" and "exited" thereby enabling the user to make execution decisions related to task-specific states. The user_defined states may be communicated by a code statement located in the task 202 that is executed and that initializes the value 230 of the user-defined state.

The term "state" as used herein refers to the configuration, attribute, condition, or information associated with the element whose state is identified. A task_state 218 represents the current states associated with the task 202.

A task_state 218 value 230 of "loaded" represents that the data associated with the task 202 has been communicated to the task manager module 102 but the task 202 has not been started. A task_state 218 having a value 230 of "start" represents that the task 202 has been started. A task_state 218 having a value 230 of "ready" represents that the task process 206 has started and the task 202 is initialized and ready for execution. A task 202 state value 230 of "ready" is communicated by a code statement located in the task 202 that is executed and that sets the parameter 210 represented by "task_state" 218 to "ready." A task_state 218 of "exit" indicates that the task 202 has terminated and is no longer executing.

The present embodiment of the task manager module 102 includes default values 230 for the information included in the configuration file 224. Thereby the present embodiment ensures consistent execution behavior of tasks 202 when the options of the configuration file 224 are only partially specified.

Figure 4D:
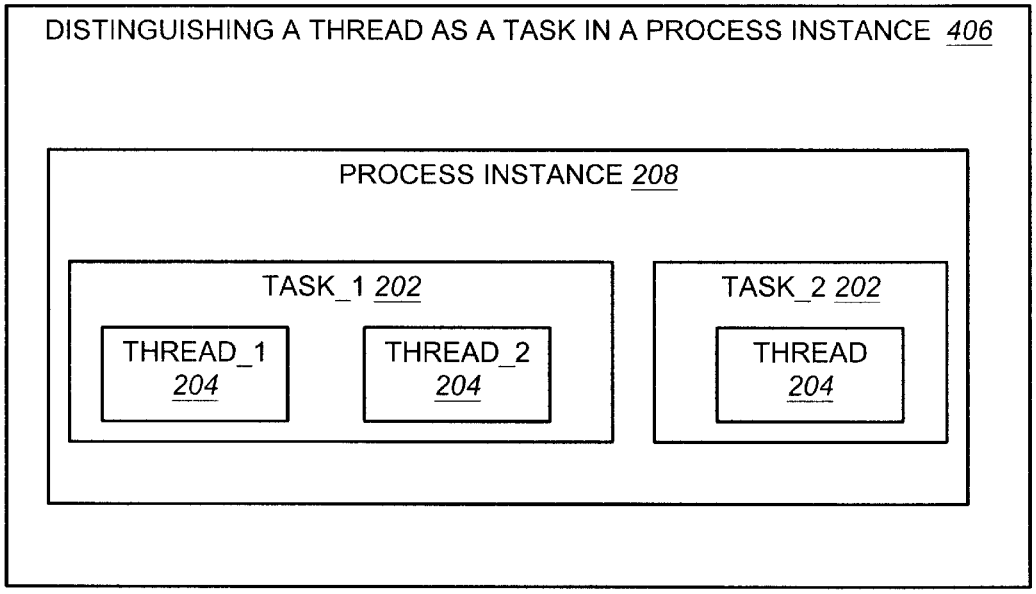

FIG. 4D is a block diagram that illustrates the operation of distinguishing a thread 204 as a task 202 that executes in a process instance 208, as shown in element 406. Recall that a process 206 is a programming structure that maintains its own set of resources while executing, and a thread 204 uses the resources of the associated process 206. A process instance 208 may be embodied as an emulator 190, such as the product marketed under the trademark JAVA™ Virtual Machine. A process instance 208 may include at least one thread 204 and according to the present embodiment may also include a task 202. Recall that a thread 204 as used herein is a programming structure that ensures execution of a block of code. A task 202 is associated with at least one thread 204 that ensures execution of the threads 204 in a specified manner.

Figure 5:
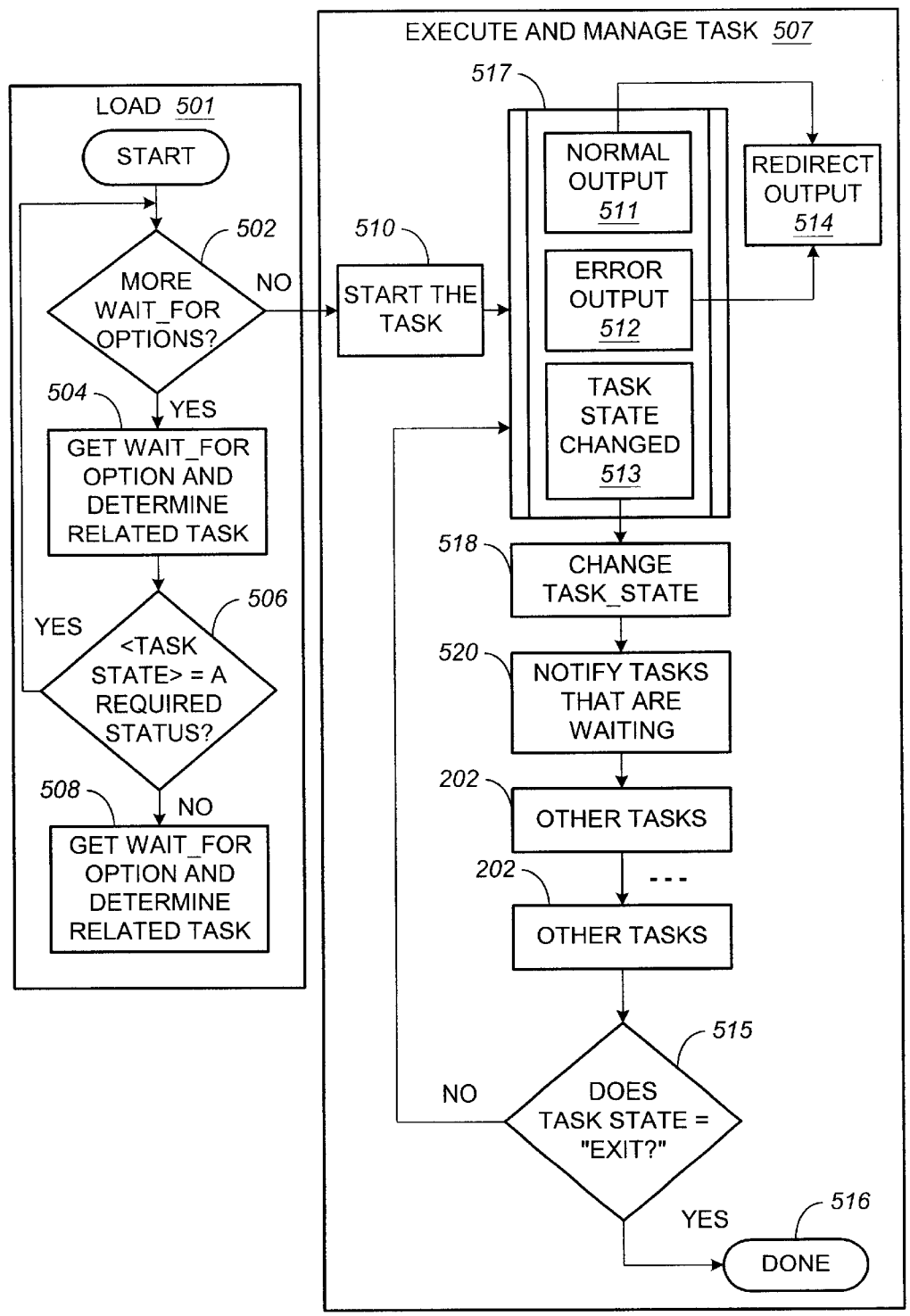
FIG. 5 is a flow diagram that illustrates the operation of loading, executing, and managing a task.

FIG. 5 is a flow diagram that illustrates the operation of loading, executing, and managing a task 202 by the task manager module 102. The present embodiment of the task manager module 102 manages information in a configuration file 224 associated with the process instance 208 that allows the user to specify tasks 202, task parameters 210 (as are shown in FIG. 2), and dependencies between tasks 202.

The operation of loading a task 202 is shown in element 501. As shown in element 502, the task manager module 102 initiates processing by determining whether there are options associated with the parameter 210 represented by "wait_for" 222 to be processed. If the test of element 502 is true then the task manager module 102 gets a option associated with "wait_for" 222 and determines the related task 202 as shown in element 504. If the task 202 state is not greater than or equivalent to a required task_state 218 as shown in the test of element 506 then the thread 204 related to the task 202 waits for the state of the task 202 to change as shown in element 508. Alternatively, if the task 202 state meets the test as shown in element 506 then another option associated with "wait_for" 222 is sought as shown in the test of element 502. In the present embodiment polling occurs that continually repeats the test as shown in element 506.

When all of the options associated with "wait_for" 222 have been accessed and associated with their related tasks 202, the task manager module 102 begins management and execution of the task 202 as shown in element 507. The task 202 is executed in the process instance 208 that is an element of the computer system 100. As shown in element 510, the task manager module 102 starts the current task 202. By means of example, the task 202 may be implemented as an object class or an executable file 172.

The present embodiment monitors the state of the current task 202 as shown in element 517. If there is normal output, as shown in element 511, the output is redirected appropriately as shown in element 514. Recall that the location for normal output and error output associated with each task 202 is identified in the configuration file 224 (as shown in FIG. 2). If there is error output, as shown in element 512, the output is redirected appropriately as shown in element 514. By means of example, normal output and error output may represent a null location or a file name.

The task manager module 102 may monitor the state associated with executing tasks 202 by a form of inter_process communication, such as a computer-readable data transmission. The present embodiment may be implemented by requiring the process instances 208 associated with tasks 202 to notify the task manager module 102 of the state of the task 202, typically by sending signals. An example of such signals are special process control messages that are communicated through the error output 212. Alternatively, notification may be implemented by placing the notification information in a common location that is accessed by all the tasks 202 associated with the process instance 208. In the present embodiment, the tasks 202 poll the state associated with the parameter 210 represented by "wait_for" 222 and take action based on change in the polled states.

The term "notify" as used herein represents a communication that results in the removal of a thread 204 that is waiting on the achievement of a state associated with a task 202. The present embodiment may alternatively operate by notifying all the threads 204 that are waiting on the achievement of a state associated with the task 202.

Therefore, if the task 202 state has changed, as shown in element 513. Then the value 230 of the parameter 210 represented by "task_state" 218 is changed as shown in element 518. The tasks 202 that are waiting on the task 202 associated with the changed state are notified as shown in element 520. A test is conducted to determine if the new task 202 state has a value 230 of "exit," as shown in element 515. If "exit" is found, then the processing is completed as shown in element 516.

When the process instance 208 associated with the task manager module 102 has completed the parameter 210 represented by "on_exit" may have been set thereby triggering the appropriate action to be taken as specified by its value 230. Therefore, the task 202 may be terminated along with other associated tasks 202. Also, the output locations associated with the terminated tasks 202 may be closed. The task manager module 102 may terminate only the task 202 that has completed, tasks 202 within the process instance 208, or all tasks 202. In the present embodiment each task 202 has an associated exit method that enables other tasks 202 to invoke termination of the task 202. The exit method will terminate the threads 204 owned by the task 202 and set the task 202 to "exit."

If the value 230 of the parameter 210 represented by "task_state" 218 is not "exit" as shown in the test of element 515, then the task manager module 102 continues processing the task 202 as shown in element 517.

Figure 6:
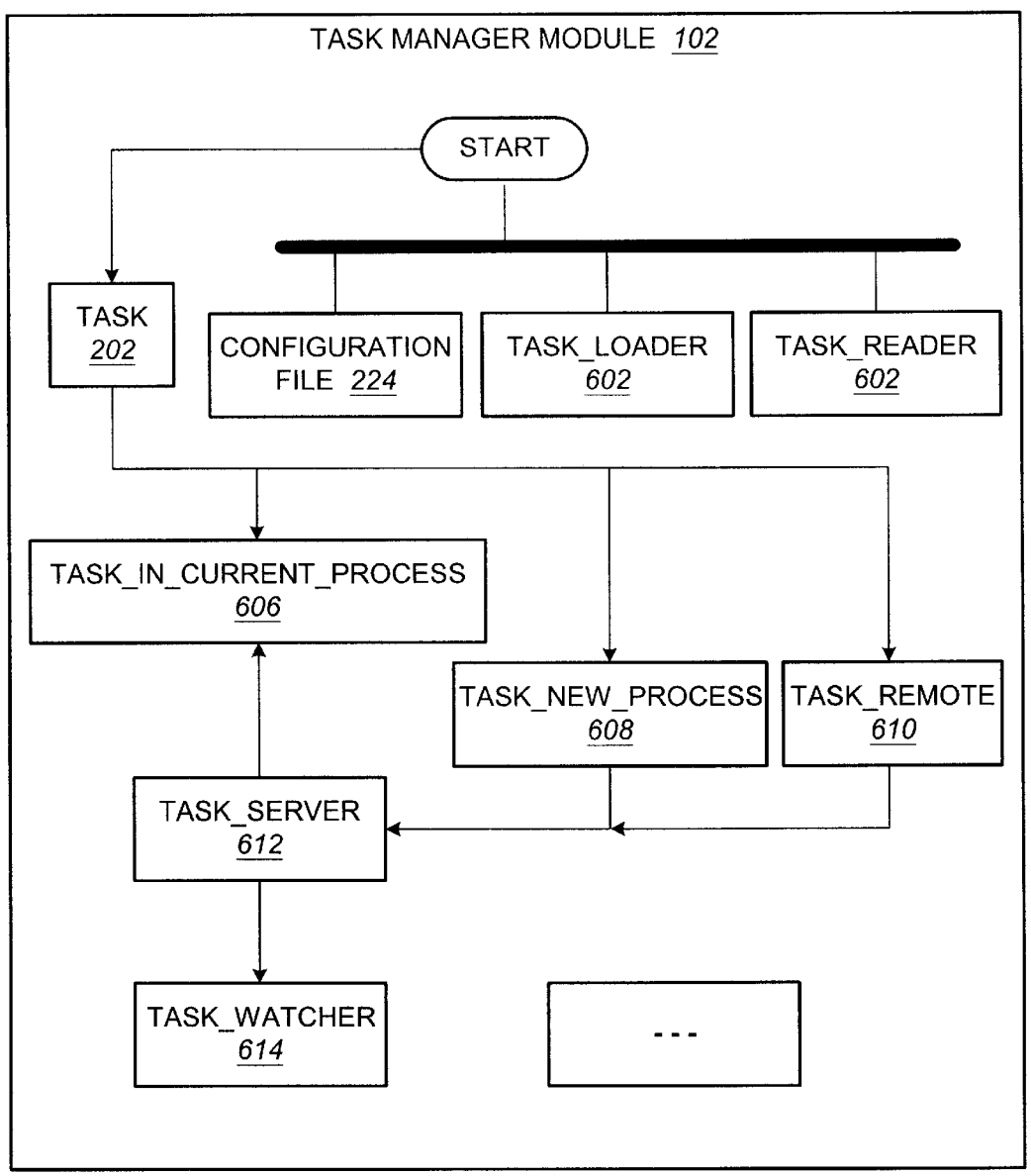
FIG. 6 is a flow diagram that illustrates the preferred embodiment of the flow of operation of the components associated with the task manager module.

FIG. 6 is a flow diagram that illustrates the preferred embodiment of the operation of the components associated with the task manager module 102 that loads and manages a task 202 according to specifications in a configuration file 224. A task_in_current_process 606 enables execution of a task 202 in the current process instance 208 (as shown in FIG. 2). In the present embodiment the task_in_current_process 606 provides the methods necessary to execute a class representing a task 202 in the current process instance 208. In the present embodiment the task_new_process 608 provides the methods necessary to execute a class representing a task 202 in a process instance 208 other than the current process instance 208. In the present embodiment the task_remote 610 provides the methods necessary to execute a class representing a task 202 in a remote process instance 208 that is operating on another computer system 100 (as shown in FIG. 1A).

The task_server 612 is a parent class that represents a task 202 that is executed in another process instance 208. The task_server 612 is given the identification of the task 202 that is responsible for executing and monitoring the target task 202. The task_new_process 608 and the task_remote 610 may use the task_server 612. The task_in_current_process 606 and the task_watcher 614 may be used by the task_server 612.

The task_loader 602 loads the task 202 in preparation for execution of the task 202. In the present embodiment, the task_loader 602 provides the methods necessary to load the classes needed to execute a task 202. The task_reader 604 accesses information about a task 202 in another process instance 208. In the present embodiment the task_reader 604 provides a non-blocking method to get output from another process instance 208. In the present embodiment, the task_watcher 614 is a thread 204 that is started by the task_server 612, that monitors the process instance 208 associated with the initial task 202, and that cleans-up when the process instance 208 associated with the initial task 202 is terminated. The clean-up operation may be performed by any means well known to those skilled in the art.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. The flow charts of the present embodiment show the architecture, functionality, and operation of an implementation of the present embodiment. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

Thus, the foregoing descriptions of specific embodiments of the task manager module are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A method in a computer system for executing at least one thread on said computer system, said computer system having at least one process instance, said method comprising:
   distinguishing at least one thread as a first task, said first task associated with said process instance;
   loading said first task in said computer system;
   identifying a second task associated with said first task in said process instance; and
   executing said first task in said process instance in accordance with execution of said second task.

2. The method of claim 1, further comprising:
   locating a configuration file in said computer system;
   associating the configuration file with said first task;
   associating a state that occurs during execution of said second task with said first task; and
   managing execution of said first task when said state has been achieved.

3. The method of claim 2, further comprising:
   terminating said first task when said state is an exit state.

4. The method of claim 2, further comprising:
   directing output from said first task to a location identified in said configuration file.

5. The method of claim 1, further comprising:
   executing said first task and said second task in said process instance.

6. The method of claim 1, further comprising:
   executing said first task in a different process instance than said process instance in which said second task executes.

7. A method in a computer system for executing at least one thread on said computer system, said computer system having at least one process instance, said method comprising:
   distinguishing at least one thread as at least one task, said at least one task associated with a process instance; and
   wherein processing said at least one task comprises:
      loading said at least one task in said computer system;
      identifying a second task associated with said first task in said process instance; and
      executing said at least one task in said process instance in accordance with execution of said second task.

8. The method of claim 7, further comprising:
   specifying an execution order for said at least one task.

9. A computer system, comprising:
   a processor; and
   a memory communicatively coupled to said processor, wherein said processor and said memory are configured to execute at least one process instance, the at least one process instance including a first task and a second task associated with the first task in the at least one process instance, the first and second tasks including at least one thread, respectively, wherein the first task is executed in accordance with execution of the second task.

10. The computer system of claim 9, further comprising:
    a configuration file stored in said memory associated with said first task, said configuration file including indicia of an association between said second task and said first task, said configuration file further including indicia of a state of said second task, wherein said state triggers management of the execution of said first task.

11. The computer system of claim 10, wherein said state of said second task triggers termination of said first task.

12. The computer system of claim 10, wherein said configuration file comprises an output location associated with said first task.

13. The computer system of claim 9, wherein said first task and said second task are executed under said process instance.

14. A computer-readable medium, comprising:
   logic configured to identify at least one thread as a first task, said first task associated with a first process instance; and
   logic configured to execute said first task in accordance with execution of a second task in said process instance.

15. The computer-readable medium of claim 14, further comprising:
   logic configured to locate a configuration file associated with said first task;
   logic configured to use said configuration file to identify said second task;
   logic configured to execute said second task;
   logic configured to identify when a state of said second task occurs during execution of said second task; and
   logic configured to manage execution of said first task responsive to the logic configured to identify.

16. The computer-readable medium of claim 14, further comprising:
   executing said first and said second tasks in one process instance.

17. The computer-readable medium of claim 14, further comprising:
   executing said first task in said first process instance; and
   executing said second task in a second process instance different from said first process instance.

18. A computer comprising:
   means for directing said computer to associate a first task with a process instance, said first task having at least one thread; and
   means for instructing said computer to execute said first task in accordance with execution of a second task in said process instance.

19. The computer of claim 18, further comprising:
   means for locating a configuration file in said computer;
   means for associating the configuration file with said at least one thread;
   means for monitoring execution of the second task to identify at least one state responsive to the configuration file; and
   means for initiating execution of the first task when the at least one state is detected by said means for monitoring.

* * * * *